C. J. PEMBROKE.
TRANSMISSION GEARING.
APPLICATION FILED AUG. 12, 1914.

1,175,805.

Patented Mar. 14, 1916.

Inventor
Charles J. Pembroke

Witnesses
Walter B. Payne
Frederick E. Fox

By
his Attorneys

UNITED STATES PATENT OFFICE.

CHARLES J. PEMBROKE, OF ROCHESTER, NEW YORK.

TRANSMISSION-GEARING.

1,175,805. Specification of Letters Patent. Patented Mar. 14, 1916.

Application filed August 12, 1914. Serial No. 856,332.

*To all whom it may concern:*

Be it known that I, CHARLES J. PEMBROKE, of Rochester, in the county of Monroe and State of New York, have invented certain new and useful Improvements in Transmission-Gearing; and I do hereby declare the following to be a full, clear, and exact description of the same, reference being had to the accompanying drawings, forming a part of this specification, and to the reference-numerals marked thereon.

My invention relates to improvements in transmission gearing, having particular reference to steering mechanisms for motor operated vehicles and the like, and it has for its object to afford a novel combination and arrangement of parts whereby motion can be transmitted between two intermeshing parts with great efficiency.

A further purpose of the invention is to obviate excessive wear of the coöperating parts, while at the same time maintaining a uniformly intimate relation between said parts constantly.

To these and other ends, the invention consists in certain improvements and combinations of parts, all as will be hereinafter more fully described, the novel features being pointed out in the claims at the end of the specification.

Figure 1:
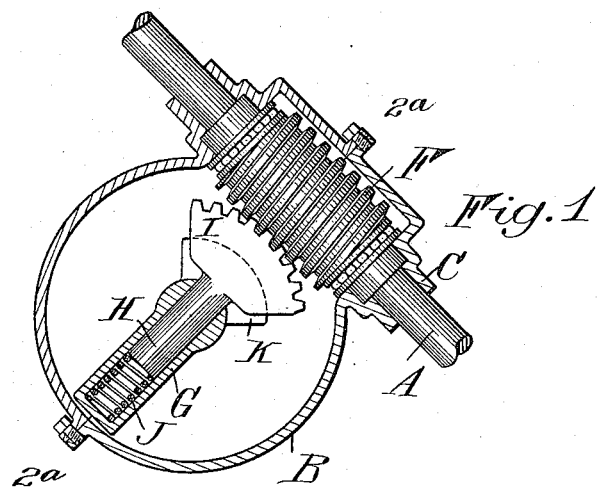
Figure 2:
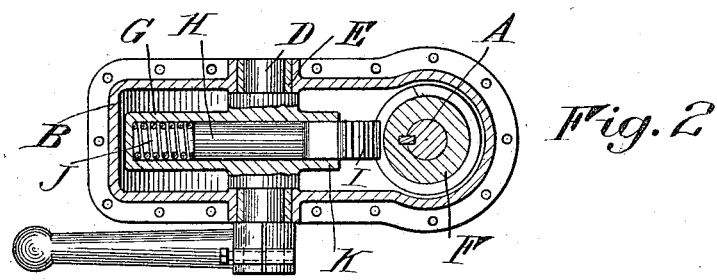

In the drawings: Figure 1 is a vertical sectional view of a structure embodying my improvements, and Fig. 2 is a sectional view taken centrally of Fig. 1.

Similar reference characters throughout the several views indicate the same parts.

In the present embodiment, I have disclosed my invention as applied to a steering mechanism for a motor operated vehicle, the usual steering column being designated at A, while B is a casing provided with bearings C to receive the steering column A. It will be understood of course that the invention is not to be limited to the particular use described, for it may be variously applied to other mechanisms which may include operating and operated members having engagement with each other for the purpose of transmitting motion from one to the other. The steering column A of the present disclosure is the operating member from which movement is transmitted to steering wheels, as usual in this class of apparatus, through an operated member which may comprise a shaft D mounted in suitable bearings E of the case B. The column A carries a worm F which is fixed thereon and acts to turn the shaft D through an intermediate gear element that will now be described.

One of the chief difficulties which has been experienced in steering devices and other mechanisms of a similar character involving coöperative relation between a worm and a gear element has been due to the enormous amount of friction set up by the power exerted, and the consequent wearing of the parts. This results in such a lost motion or play between the geared members, that it very quickly destroys the efficiency of the mechanism, and I overcome this by providing means for forcing the gear members constantly into proper operative engagement with each other. To this end, the shaft or operated member D carries a sleeve G which is mounted in fixed relation on the shaft. Arranged within the sleeve G is a post H upon which is mounted a gear element or segment I engaging the worm F. The post H rests upon a spring J arranged at the base of the sleeve G, said spring constantly acting against the base of post H to force the latter outwardly, and thereby maintaining the gear element I in close engagement with the worm F. The post H is prevented from turning within the sleeve G by means of the flanges K, which engage the sides of the gear segment I. With this construction, a considerable amount of wear can take place between the worm F and the gear segment I without effecting a loosened engagement between them, or in any other manner permitting a lessening of the efficiency of the mechanism, since the gear segment I will be actuated into engagement with the worm F by a substantially constant pressure.

It will be understood that the invention is not limited to the exact arrangement of parts herein shown, as I intend to cover by this application any modification or analogous construction that may be comprehended by the appended claims.

I claim as my invention:

1. The combination with an operating worm, of an operated member controlled thereby and a gear element resiliently mounted on the operated member for engagement with the operating worm and movable in a plane that passes through the axis of the worm.

2. The combination with an operating worm, of an operated member controlled thereby and provided with a sleeve, a spring arranged in said sleeve, a post loosely mounted in the sleeve supported on said spring, and a gear segment carried by the post for engagement with said worm and movable in a plane that passes through the axis of the worm.

CHARLES J. PEMBROKE.

Witnesses:
H. E. STONEBRAKER,
G. WILLARD RICH.

Copies of this patent may be obtained for five cents each, by addressing the "Commissioner of Patents, Washington, D. C."